(12) United States Patent
Ouchi et al.

(10) Patent No.: US 8,528,848 B2
(45) Date of Patent: Sep. 10, 2013

(54) WEBBING TAKE-UP DEVICE

(75) Inventors: Kimihiro Ouchi, Aichi-ken (JP);
Shigeru Kotama, Aichi-ken (JP)

(73) Assignee: Kabushiki Kaisha Tokai-Rika-Denki-Seisakucho, Aichi-ken (JP)

( * ) Notice: Subject to any disclaimer, the term of this patent is extended or adjusted under 35 U.S.C. 154(b) by 418 days.

(21) Appl. No.: 12/471,883

(22) Filed: May 26, 2009

(65) Prior Publication Data
US 2009/0294565 A1    Dec. 3, 2009

(30) Foreign Application Priority Data
May 28, 2008    (JP) ................................ 2008-139472

(51) Int. Cl.
*B60R 22/46*    (2006.01)
(52) U.S. Cl.
USPC .......................................... 242/374; 242/394
(58) Field of Classification Search
USPC ........... 242/374, 390.8, 390.9, 394; 280/806, 280/807; 297/475–478, 480; 192/46
See application file for complete search history.

(56) References Cited

U.S. PATENT DOCUMENTS

| | | | | |
|---|---|---|---|---|
| 4,641,614 A | * | 2/1987 | Krebs | 123/185.3 |
| 4,928,643 A | * | 5/1990 | Kampichler et al. | 123/185.3 |
| 5,443,147 A | * | 8/1995 | Gratzer | 192/27 |
| 2003/0000796 A1 | * | 1/2003 | Kawai et al. | 192/223.2 |
| 2004/0075008 A1 | * | 4/2004 | Mori et al. | 242/390.8 |
| 2005/0082411 A1 | * | 4/2005 | Prokscha et al. | 242/390.8 |
| 2006/0169820 A1 | * | 8/2006 | Takamatsu et al. | 242/379.1 |
| 2007/0051841 A1 | * | 3/2007 | Mori | 242/374 |

FOREIGN PATENT DOCUMENTS
JP    2005-170367 A    6/2005

* cited by examiner

*Primary Examiner* — Sang Kim
*Assistant Examiner* — Scott Haugland
(74) *Attorney, Agent, or Firm* — Roberts Mlotkowski Safran & Cole, P.C.

(57) ABSTRACT

A webbing take-up device provided with a clutch disposed between a take-up shaft and a motor, the clutch coupling and releasing coupling of the take-up shaft to the motor. When a gear wheel of the clutch is rotated in a take-up direction by the motor, a friction spring mounted to a spring housing portion of the clutch housing moves a pawl with a first protrusion of the friction spring, causing the pawl to mesh with a ratchet wheel. Relative rotation of the gear wheel with respect to the ratchet wheel (spool) in the take-up direction is thereby restricted, and the spool rotates with the gear wheel in the take-up direction. Since the pawl is directly moved by the friction spring mounted on the clutch housing, the configuration for moving the pawl can be simplified.

4 Claims, 5 Drawing Sheets

WEBBING TAKE-UP DEVICE

CROSS-REFERENCE TO RELATED APPLICATION

This application claims priority under 35 USC 119 from Japanese Patent Application No. 2008-139472, the disclosure of which is incorporated by reference herein.

BACKGROUND OF THE INVENTION

1. Field of the Invention

The present invention relates to a webbing take-up device for taking-up, and accommodating on a take-up shaft, webbing for restraining an occupant of a vehicle, and more particularly relates to a webbing take-up device that can take-up webbing by motor drive power.

2. Description of the Related Art

Webbing take-up devices are known that have a clutch interposed between a take-up shaft and a motor (see, for example, Japanese Patent Application Laid-Open (JP-A) No. 2005-170367). The webbing take-up device described in JP-A No. 2005-170367 is provided with a wheel (rotating body) that is rotated by motor, and a pawl capable of meshing with a spool is attached to the wheel. A circular coupling disk is provided adjacent to the wheel, the circular coupling disk being restrained by a support member due to frictional force of a friction spring. A control tongue portion is provided to the circular coupling disk for cooperating with the pawl. Configuration is made such that, when the wheel is rotated, clutch engaging and clutch releasing are performed by the pawl moving due to the control tongue portion.

In the webbing take-up device configured as described above, however, the configuration for moving the pawl is complicated due to requiring the circular coupling disk and friction spring in order to move the pawl.

SUMMARY OF THE INVENTION

In consideration of the above circumstances, the present invention provides a webbing take-up device enabling a simplified configuration for moving a pawl during motor actuation.

A webbing take-up device according to a first aspect of the present invention is a webbing take-up device including: a take-up shaft that takes up webbing for restraining a vehicle occupant by being rotated in a take-up direction, and that is rotated in a withdrawing direction by the webbing being pulled out; a motor that rotates the take-up shaft in the take-up direction; and a clutch disposed between the take-up shaft and the motor, the clutch coupling and releasing coupling between the take-up shaft and the motor, wherein the clutch comprises: a pawl moveable between a coupled position, in which the pawl is directly or indirectly coupled to the take-up shaft, and a released position, in which the coupling is released, with the pawl being biased toward the released position; and a friction spring, a first circumferential direction end of the friction spring directly acting on the pawl due to actuation of the motor, moving the pawl toward the coupled position and holding the pawl in the coupled position, with the diameter of the friction spring increasing on rotation in the take-up direction due to one end of the friction spring being pressed by the pawl.

In the webbing take-up device according to the first aspect of the present invention, when the motor is actuated, a first circumferential direction end (one circumferential direction end) of the friction spring directly acts on the pawl moving the pawl toward the coupled position and holding the pawl in the coupled position. The motor and the take-up shaft are thereby coupled, and the take-up shaft rotated in the take-up direction. Webbing is consequently taken up on the take-up shaft, and restraining force on a vehicle occupant due to the webbing is increased. Since the pawl is directly moved by the friction spring in this manner, the configuration for moving the pawl can be simplified.

A webbing take-up device according to a second aspect of the present invention is a webbing take-up device including: a take-up shaft that takes up webbing for restraining a vehicle occupant by being rotated in a take-up direction, and that is rotated in a withdrawing direction by the webbing being pulled out; a rotating body provided at one side of the take-up shaft in the axial line direction; a support member that supports the take-up shaft and the rotating body such that relative rotation therebetween is permitted in the take-up direction and in the withdrawing direction, the support member being provided with a spring mounting portion with an outer peripheral portion coaxial to the rotating body; a motor that rotates the rotating body in the take-up direction; a pawl attached to the rotating body, the pawl being moveable between a coupled position, in which relative rotation of the rotating body with respect to the take-up shaft is restricted in the take-up direction, and a released position, in which the restriction is released, with the pawl being biased toward the released position; and a friction spring, mounted to the support member by pressing of the inner peripheral portion of the friction spring onto the outer peripheral portion of the spring mounting portion by elastic force, a first circumferential direction end of the friction spring moving the pawl toward the coupled position and holding the pawl in the coupled position when the rotating body is rotated in the take-up direction, with the diameter of the friction spring increasing on rotation of the friction spring in the take-up direction following the rotating body, due to the first circumferential direction end of the friction spring being pressed by the pawl.

In the webbing take-up device according to the second aspect of the present invention, when the pawl-attached rotating body is rotated in the take-up direction by the motor, the first circumferential direction end of the friction spring that is mounted to the support member moves the pawl toward the coupled position and holds the pawl in the coupled position. Relative rotation of the rotating body with respect to the take-up shaft is thereby restricted in the take-up direction, and the take-up shaft is rotated in the take-up direction together with the rotating body. Consequently webbing is taken up on the take-up shaft, and restraining force on a vehicle occupant due to the webbing increases. Since the pawl is directly moved in this manner by the friction spring mounted to the support member, the configuration for moving the pawl can be simplified.

However, the friction spring is mounted to the support member by elastic force from pressing the inner peripheral portion of the friction spring onto the outer peripheral portion of the spring mounting portion and the diameter of the friction spring increases on rotation of the friction spring in the take-up direction following the rotating body, due to the first circumferential direction end of the friction spring being pressed by the pawl. Consequently the frictional resistance generated between the inner peripheral portion of the friction spring and the outer peripheral portion of the spring mounting portion can be reduced, and motor drive power loss can be made small.

The webbing take-up devices according to the first and the second aspects of the present invention may further include a pre-tensioner mechanism that when actuated rotates the take-up shaft in the take-up direction, and there may be a ratchet wheel to which the pawl moved to the coupled position meshes, with the ratchet wheel being coupled to the take-up shaft. When the pre-tensioner mechanism is actuated when in a state in which the friction spring is holding the pawl in the coupled position, the ratchet wheel permits rotation of the take-up shaft in the take-up direction by moving the pawl toward the released position as the ratchet wheel increases the diameter of the friction spring.

In the webbing take-up device configured as above, the ratchet wheel is coupled to the take-up shaft, and the pawl moved toward the coupled position by the friction spring meshes with the ratchet wheel. When the pre-tensioner mechanism is actuated when in a state in which the friction spring is holding the pawl in the coupled position, the take-up shaft is rotated in the take-up direction and the ratchet wheel coupled to the take-up shaft moves the pawl toward the released position as the ratchet wheel increases the diameter of the friction spring. Rotation of the take-up shaft in the take-up direction is thereby permitted. Consequently, rapid rotation of the take-up shaft in the take-up direction by the pre-tensioner mechanism is possible, and it becomes possible to rapidly increase restraining force on a vehicle occupant due to the webbing.

The webbing take-up devices according to the first and the second aspects of the present invention may be configured such that when the motor rotates in reverse, the friction spring rotates in the withdrawing direction due to a second circumferential direction end (the other circumferential direction end) of the friction spring being pressed, and the holding of the pawl by the first circumferential direction end of the friction spring is released.

In the webbing take-up device configured as above, when the motor rotates in reverse, the friction spring rotates in the withdrawing direction due to a second circumferential direction end of the friction spring being pressed, and the holding of the pawl by the first circumferential direction end of the friction spring is released. The pawl that is biased toward the released position consequently moves toward the released position, releasing the coupling of the take-up shaft to the motor.

In this configuration of webbing take-up device, when the motor is rotated in reverse, rotational force is input to the second circumferential direction end of the friction spring, and when the motor is rotated forward, rotational force is input to the first circumferential direction end of the friction spring. Good durability of the friction spring can thereby be ensured due to the use of rotational force as input portions at both circumferential direction end portions of the friction spring in this manner.

As explained above, the webbing take-up device according to the present invention enables simplification of the configuration for moving the pawl when the motor is actuated.

DETAILED DESCRIPTION OF THE INVENTION

Figure 1:
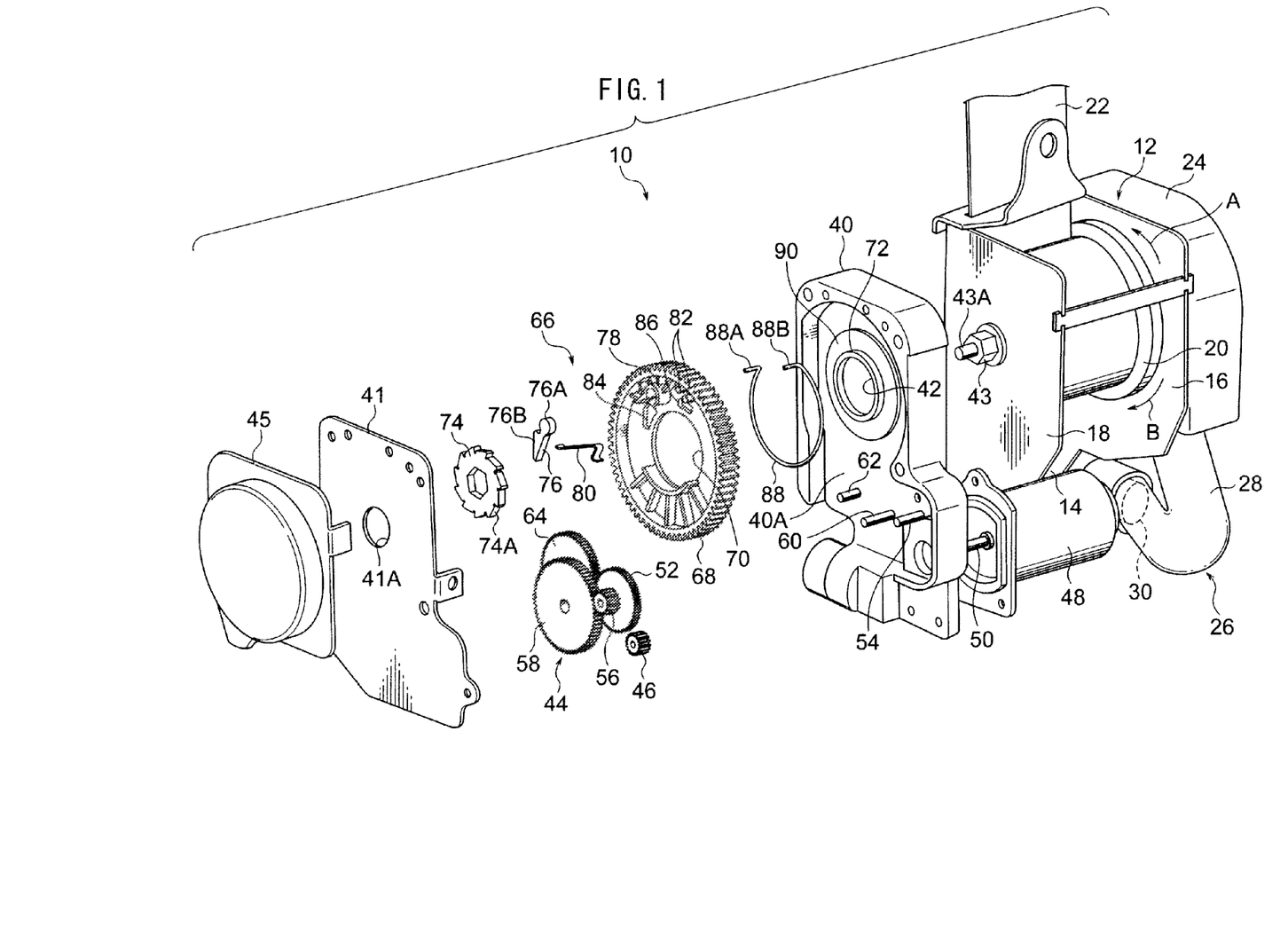
FIG. 1 is a schematic exploded perspective view showing a configuration of a webbing take-up device according to an exemplary embodiment of the present invention.
Figure 2:
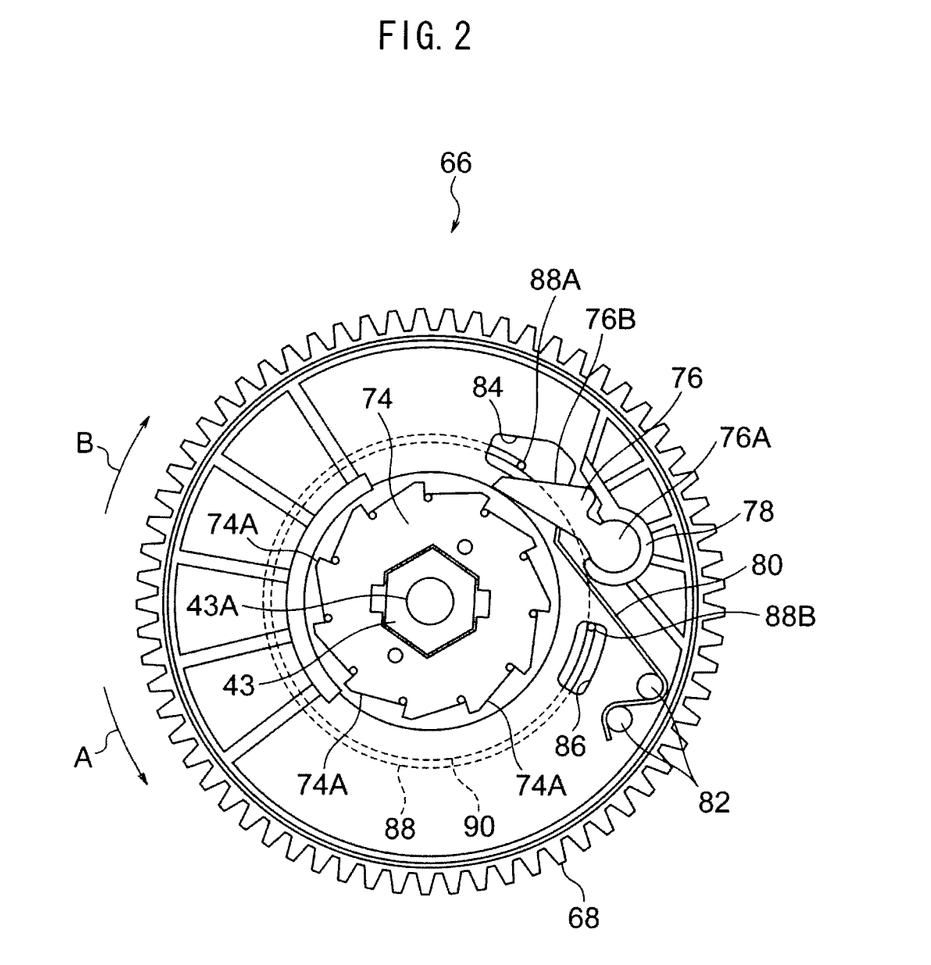
FIG. 2 is a front view showing a configuration of a clutch, a component configuring a webbing take-up device according to the present exemplary embodiment, shown in a state with a pawl disposed in a released position.
Figure 3:
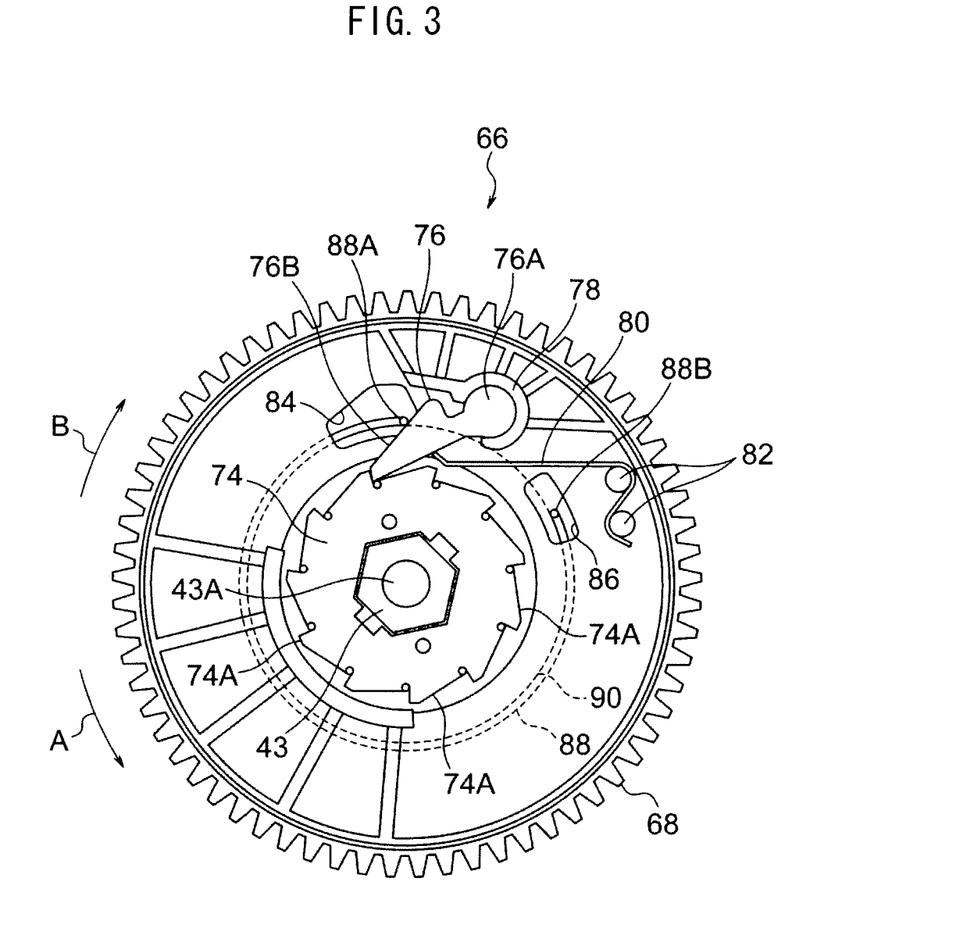
FIG. 3 is a front view showing a configuration of the clutch, a component configuring a webbing take-up device according to the present exemplary embodiment, shown in a state with the pawl disposed in a coupled position.
Figure 4:
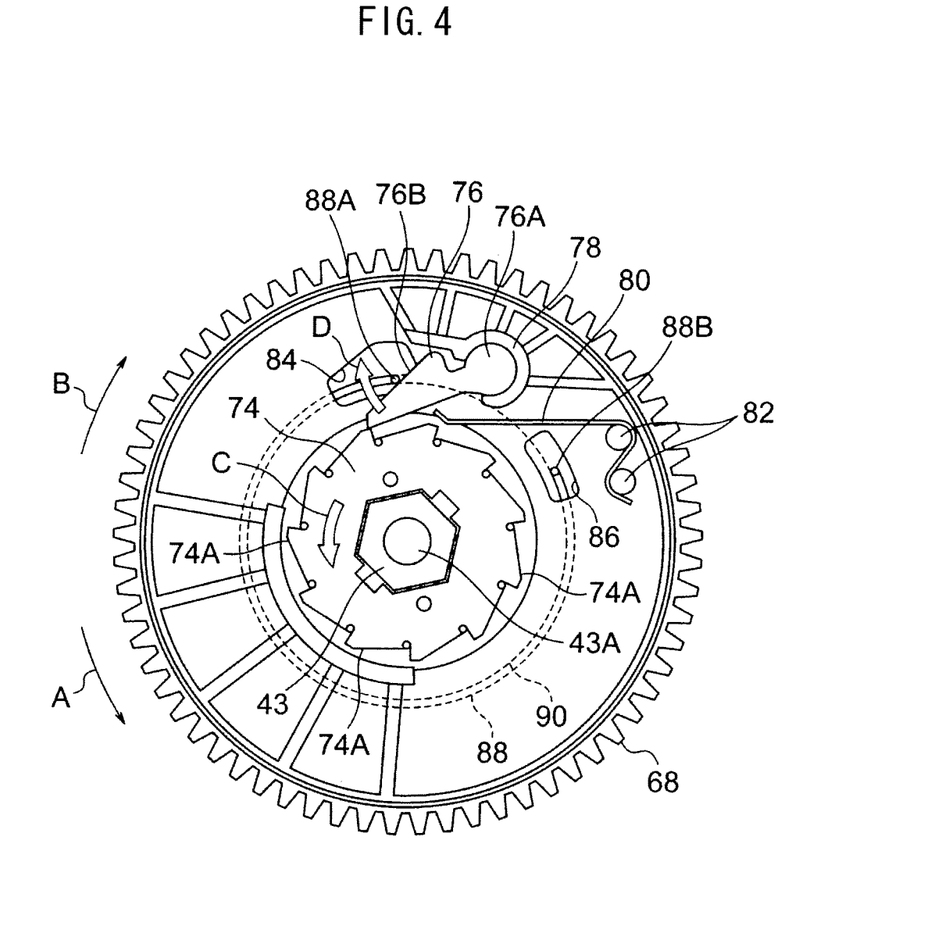
FIG. 4 is a front view showing a configuration of the clutch, a component configuring a webbing take-up device according to the present exemplary embodiment, shown in a state with the pawl moved toward the released position side by a ratchet wheel.

FIG. 1 is a schematic exploded perspective view of a webbing take-up device 10 according to an exemplary embodiment of the present invention. FIGS. 2 to 4 are schematic front views of a main portion of a clutch 66, a main component configuring the webbing take-up device 10.

As shown in FIG. 1, the webbing take-up device 10 is provided with a frame 12, configuring a support member. The frame 12 is provided with a flat plate shaped back plate 14. The webbing take-up device 10 is a structure that is attached to a vehicle body, by the back plate 14 being fixed with non-illustrated fasteners, such as bolts or the like, for example, in the vicinity of a lower end of a vehicle body center pillar. A pair of leg plates 16, 18 is formed extending from the two width direction edges of the back plate 14, these extending out parallel to each other and facing each other substantially along the vehicle front-rear direction. A spool 20 (take-up shaft) is disposed between the leg plates 16, 18, the spool 20 being formed in substantially a circular cylindrical shape.

The spool 20 has an axial line direction along the facing direction of the leg plates (leg lugs) 16, 18 and is rotatable about its own axial line. A portion at the length direction base end of a long strip shaped webbing 22 is engaged with the spool 20. The webbing 22 is accommodated on the spool 20 by taking the webbing 22 up on the outer periphery of the spool 20 in layers, from the base end of the webbing 22, by rotating the spool 20 about its axial line in a take-up direction (the direction shown by arrow A in FIGS. 1 to 4). When the webbing 22 is pulled out from its leading end, the webbing 22 taken up on the spool 20 is withdrawn, and this is accompanied by rotation of the spool 20 in a withdrawing direction (shown by arrow B in FIGS. 1 to 4), a direction opposite to the take-up direction.

A non-illustrated torsion shaft is disposed inside the spool 20 and coaxially to the spool 20. One end of the torsion shaft in the axial line direction (an end portion at the leg plate 18 side) is coupled to the spool 20 so that relative rotation of the torsion shaft with respect to the spool 20 is not permitted, and the other end of the torsion shaft protrudes through a through hole formed passing through the leg plate 16 out to the outside of the frame 12 (to the opposite side of the leg plate 16 to that of the spool 20).

A sensor cover 24 made from resin is attached to the leg plate 16 at the opposite side to that of the spool 20. The sensor cover 24 is formed in a box shape open to the leg plate 16 side. This other end of the torsion shaft in the axial line direction is inserted into the inside of the sensor cover 24, and is supported by a non-illustrated shaft receiving portion provided to the sensor cover 24. A non-illustrated known lock mechanism is housed inside the sensor cover 24. This lock mechanism is configured to restrict rotation of the torsion shaft in the withdrawing direction, such as during rapid deceleration of the vehicle.

A pre-tensioner mechanism 26 is provided at the opposite side of the leg plate 16 to that of the spool 20. The pre-tensioner mechanism 26 is provided with a cylinder 28 fixed to the leg plate 16, and a gas generator 30 is housed in a portion at the lower end of the cylinder 28. The gas generator 30 is configured to generate high pressure gas within the cylinder 28 by actuating a non-illustrated ignition device. A non-illustrated piston is housed within the cylinder 28, and this piston is configured so as to protrude out from the cylinder 28 in the take-up direction and forcibly rotate the torsion shaft when gas is generated within the cylinder 28.

A clutch housing 40 configuring a support member is attached to the leg plate 18 at the opposite side to that of the spool 20. The clutch housing 40 is formed in a box shape open toward the opposite side to that of the leg plate 18, with the opening closed off by a cover 41. A circular through hole 42 is formed in a side wall 40A of the clutch housing 40. The spool 20 is disposed so as to have the same center as that of the spool 20, and an adapter 43 is disposed inside the through hole 42. The adapter 43 is formed in a hexagonal pillar shape, and is fixed coaxially to one axial line direction end of the torsion shaft that passes through a through hole formed in the leg plate 18. The adapter 43 therefore rotates as one with the torsion shaft and the spool 20.

A circular cylindrical shaped support shaft portion 43A is integrally provided coaxial to the adapter 43 so as to protrude out from the side of the adapter 43 opposite to the side of the spool 20. The support shaft portion 43A protrudes out to the outside of the clutch housing 40 (at the opposite side of the clutch housing 40 to that of the leg plate 18) through a through hole 41A formed through the cover 41.

A spring cover 45 made from resin is provided at the opposite side to that of the leg plate 18, with the clutch housing 40 interposed therebetween. The spring cover 45 is formed in substantially a bottomed circular cylindrical shape open to the leg plate 18 side, and is attached to the leg plate 18 with the clutch housing 40 interposed therebetween. The support shaft portion 43A of the adapter 43 is inserted into the spring cover 45 and is rotatably supported by a non-illustrated shaft receiving portion provided to the spring cover 45.

A non-illustrated spiral spring is housed inside the spring cover 45. The spiral direction outside end of the spiral spring is engaged with the spring cover 45, and the spiral direction inside end of the spiral spring is engaged with the support shaft portion 43A, biasing the spool 20 in the take-up direction through the adapter 43 and the torsion shaft.

A reducing gear train 44 is housed on the inside of the above described clutch housing 40. The reducing gear train 44 is provided with a gear 46 having external flat teeth. The gear 46 is housed inside of the clutch housing 40 in a state with the axial line direction of the gear 46 being the same as the axial line direction of the spool 20.

The gear 46 is fixed to an output shaft 50 of a motor 48 attached to the clutch housing 40. An external flat toothed gear 52 is provided at the rotational radial direction side of the gear 46, with the number of teeth of the gear 52 being greater than that of the gear 46. A support shaft 54 is formed to the clutch housing 40 so as to align with the gear 52. The axial line direction of the support shaft 54 is in the same direction as the axial line direction of the spool 20, and the gear 52 is supported on the support shaft 54 in a meshed state with the gear 46 so as to be able to rotate about the support shaft 54.

An external flat toothed gear 56 is integrally formed to the gear 52 at an axial line direction side thereof, with the gear 56 being coaxial to the gear 52. An external flat toothed gear 58 is provided at the rotational radial direction side of the gear 56, with the number of teeth of the gear 58 being greater than that of the gear 56. A support shaft 60 is formed to the clutch housing 40 so as to align with the gear 58. The axial line direction of the support shaft 60 is in the same direction as the axial line direction of the spool 20, and the gear 58 is supported on the support shaft 60 in a meshed state with the gear 56 so as to be able to rotate about the support shaft 60.

A support shaft 62 is formed to the clutch housing 40, with the axial line direction of the support shaft 62 in the same direction at the axial line direction of the spool 20, and an external flat toothed gear 64 is supported on the support shaft 62 so as to be able to rotate about the support shaft 62. A non-illustrated external flat toothed gear is integrally formed coaxial to the gear 64, and this gear that is integrally formed coaxial to the axial line direction side of the gear 64 meshes with a gear that is integrally formed coaxial to the gear 58 at the axial line direction side of the gear 58. Configuration is thus made such that rotation of the output shaft 50 of the motor 48 can be transmitted through to the gear 64.

A clutch 66 is also provided at the rotation radial direction side of the gear 64. A gear wheel 68 is provided as a rotating body to the clutch 66. The gear wheel 68 is formed as a bottomed circular cylindrical shape opening to the cover 41 side, with external teeth formed to the outer periphery of the gear wheel 68 meshing with the gear 64. A circular shaped through hole 70 is formed at the axial center of the gear wheel 68, and a ring shaped shaft receiving portion 72 formed to the clutch housing 40 fits inside the through hole 70 so as to permit relative rotation between the shaft receiving portion 72 and the through hole 70. The shaft receiving portion 72 projects out to the gear wheel 68 side from hole rim portion of the through hole 42 described above, with the shaft receiving portion 72 disposed so as to have the same center as the spool 20. The gear wheel 68 therefore is permitted to rotate coaxially relative to the spool 20.

A ratchet wheel 74 formed with ratchet teeth 74A (teeth) on the outer periphery thereof is disposed at the face of the gear wheel 68 on the cover 41 side. The ratchet wheel 74 is formed in a circular disk shape, and the adapter 43 described above fits into a hexagonal cross-section shaped through hole formed at the axial center of the ratchet wheel 74. The ratchet wheel 74 is thereby attached coaxially to the adapter 43 so that relative rotation therebetween is prevented, so that the ratchet wheel 74 rotates as one with the non-illustrated torsion shaft and the spool 20.

A pawl 76 is provided at the radial direction outside of the ratchet wheel 74. As shown in FIGS. 2 to 4, the pawl 76 is provided at the base end thereof with a substantially circular pillar shaped support shaft portion 76A that fits into a substantially circular cylindrical shaped shaft receiving portion 78 formed to the gear wheel 68. The pawl 76 is thereby supported so as to be able to swing relative to the gear wheel 68, permitting movement between a coupled position, in which the leading end of the pawl 76 meshes with the ratchet teeth 74A of the ratchet wheel 74 (the position shown in FIG. 3), and a released position, in which this meshing is released (the position shown in FIG. 2).

Configuration is thus made such that in the state in which the pawl 76 is disposed in the coupled position, relative rotation of the gear wheel 68 in the take-up direction relative to the ratchet wheel 74 is restricted, and in the state in which the pawl 76 is disposed in the released position the above rotation restriction is released.

A plate spring 80, formed in a long plate shape, is provided at one side of the pawl 76 in the circumferential direction of the gear wheel 68. The plate spring 80 is formed bent into an S-shape at one end in the length direction, and this end engages with a pair of engaging pillars 82 provided to the gear wheel 68, with the other length direction end of the plate spring 80 abutting the end face of the pawl 76 at the ratchet wheel 74 side, biasing the pawl 76 toward the released position. The pawl 76 therefore is usually held in the released position by the plate spring 80.

A through hole 84 of substantially rectangular shape is formed in the gear wheel 68 at the take-up direction side of the pawl 76, and a through hole 86 of substantially rectangular shape is formed in the gear wheel 68 at the withdrawing direction side of the pawl 76. A friction spring 88 is aligned with these through holes 84, 86. The friction spring 88 is one formed by bending spring material of metal wire form around into a C-shape, and the friction spring 88 is disposed between the side wall 40A of the clutch housing 40 and the gear wheel 68. A spring mounting portion 90 is provided to the side wall 40A in order to mount the friction spring 88. The spring mounting portion 90 is formed so as to extend out in a circular pillar shape from one portion of the side wall 40A toward the gear wheel 68 side, with an outer peripheral portion of the spring mounting portion 90 having the same center as that of the spool 20 (note that the through hole 42 and shaft receiving portion 72 described above are formed at the central portion of the spring mounting portion 90).

The friction spring 88 is mounted at the outside periphery of the spring mounting portion 90 such that, in the fitted state, the spring mounting portion 90 is at positioned at the inside of the friction spring 88, and relative rotation of the friction spring 88 is permitted with respect to the spring mounting portion 90 (clutch housing 40).

More precisely, the external diameter dimension of the spring mounting portion 90 is formed slightly larger than the internal diameter of the friction spring 88 when in its natural state, and so the friction spring 88 is mounted to the outer periphery of the spring mounting portion 90 in an increased diameter state (an elastically deformed state so as to increase the internal diameter dimension thereof). The friction spring 88 is therefore held on the spring mounting portion 90 by the inner peripheral portion of the friction spring 88 pressing the outer periphery of the spring mounting portion 90 by elastic force of the friction spring 88, and the friction spring 88 does not rotate relative to the spring mounting portion 90 unless rotational force occurs exceeding the static friction force generated between the friction spring 88 and the spring mounting portion 90.

Figure 5:
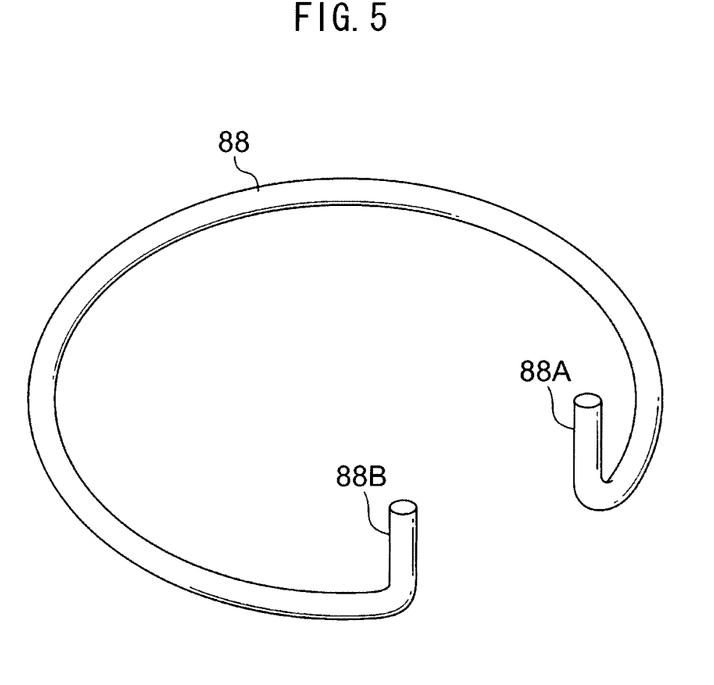
FIG. 5 is a perspective view of a friction spring, a component configuring the clutch shown in FIGS. 2 to 4.

The friction spring 88 is bent around to along the axial line direction at both circumferential direction ends, and a first protrusion 88A is thereby provided protruding toward the gear wheel 68 side at one circumferential direction end of the friction spring 88 (see FIG. 5). The first protrusion 88A passes through the through hole 84 of the gear wheel 68, and is disposed at the take-up direction side of the pawl 76 and at the opposite side of the pawl 76 to the ratchet wheel 74 (outside the pawl 76). A second protrusion 88B is also provided protruding toward the gear wheel 68 side at the other circumferential direction end of the friction spring 88. The second protrusion 88B is disposed inside the through hole 86 of the gear wheel 68.

Configuration is thus made such that, as shown in FIG. 2, the first protrusion 88A is disposed slightly separated from the leading end side of the pawl 76 when the second protrusion 88B of the friction spring 88 is in an abutting state with the take-up direction side hole edge of the through hole 86. There is an angled face 76B formed to the leading end side of the pawl 76 at a location facing the first protrusion 88A. The angled face 76B is formed at the opposite side of the pawl 76 to that of the ratchet wheel 74 (at the outside of the pawl 76), and is angled so as to be disposed more inward in the radial direction of the gear wheel 68 on progression toward the take-up direction. The friction spring 88 is normally disposed relative to the gear wheel 68 in the state shown in FIG. 2.

Explanation will now be given of the operation of the present exemplary embodiment.

In the webbing take-up device 10, for example, when, based on detection results from a forward monitoring device such as a radar distance measuring device or an infrared distance measuring device, it is determined by a controller (non-illustrated) such as an ECU that the distance to an obstacle, such as another vehicle moving in front of or stationary in front of the vehicle to which the webbing take-up device 10 has been installed, has become less than a specific value, then the controller causes the motor 48 to drive in the forward rotation direction. The output shaft 50 rotates in the forward rotation direction due to the forward rotation direction force of the motor 48, and this forward rotation of the output shaft 50 is transmitted to the gear wheel 68 of the clutch 66 through the reducing gear train 44, rotating the gear wheel 68 in the take-up direction. When the gear wheel 68 rotates in the take-up direction, the pawl 76 attached to the gear wheel 68 rotates together with the gear wheel 68 in the take-up direction.

Therefore, as shown in FIG. 3, the angled face 76B of the pawl 76 abuts the first protrusion 88A of the friction spring 88, the pawl 76 is moved to the coupled position by the first protrusion 88A and held in the coupled position. The leading end of the pawl 76 thereby meshes with the ratchet teeth 74A of the ratchet wheel 74, restricting relative rotation of the gear wheel 68 with respect to the ratchet wheel 74 in the take-up direction. When the gear wheel 68 is further rotated in the take-up direction from this state, the ratchet wheel 74 also rotates with the gear wheel 68 in the take-up direction.

The ratchet wheel 74 is coupled to the spool 20 through the adapter 43 and the torsion shaft, and the spool 20 is rotated in the take-up direction by rotation of the ratchet wheel 74 in the take-up direction, and the webbing 22 is taken up on the spool 20 from the base end in the length direction of the webbing 22. The slight droop in the webbing 22 fitted around the body of the vehicle occupant, the "slack", is thereby removed, and the capability of the webbing 22 to restrain the vehicle occupant is increased.

When the gear wheel 68 is rotated in the take-up direction together with the pawl 76 as described above, friction spring 88 follows rotation of the gear wheel 68 in the take-up direction while applying friction to the spring mounting portion 90, due to the first protrusion 88A of the friction spring 88 being pressed by the pawl 76. When this occurs, since there is a component of force from the angled face 76B of the pawl 76 acting toward the radial direction outside, the friction spring 88 rotates in the take-up direction while elastically deforming such that the internal diameter dimension thereof gradually increases. Therefore, the frictional resistance generated between the inner peripheral portion of the friction spring 88 and the outer peripheral portion of the spring mounting portion 90 reduces. Consequently, drive power loss of the motor 48 can be reduced.

However, when the controller described above determines that there is a high possibility of collision for the vehicle, based on the detection results of the forward monitoring device, the controller actuates the gas generator 30 of the pre-tensioner mechanism 26. When the gas generator 30 is actuated, high pressure gas is generated within the cylinder 28, and the non-illustrated piston is made to protrude out from the cylinder 28, rapidly rotating the torsion shaft in the take-up direction. The spool 20 that is coupled to the torsion shaft consequently rapidly rotates in the take-up direction, and also the ratchet wheel 74 that is coupled to the torsion shaft through the adapter 43 rapidly rotates in the take-up direction (see the direction shown by arrow C in FIG. 4). When this occurs, the ratchet teeth 74A press the pawl 76 toward the released position increasing the diameter (elastically deforming) the friction spring 88, and movement of the pawl 76 toward the released position is permitted (see the direction shown by arrow D in FIG. 4). Relative rotation of the ratchet wheel 74 in the take-up direction with respect to the gear wheel 68 is thereby permitted, and the ratchet wheel 74 (namely the spool 20) is rapidly rotated in the take-up direction. The webbing 22 is consequently forcibly taken up on the spool 20, and the restraining force due to the webbing 22 on the vehicle occupant further increases.

However, when the controller described above determines that the possibility of collision for the vehicle has been avoided, the motor 48 is driven to rotate in reverse. The reverse rotation driving force of the motor 48 rotates the output shaft 50 in reverse, and this reverse rotation is transmitted to the gear wheel 68 of the clutch 66 through the reducing gear train 44, rotating the gear wheel 68 in the withdrawing direction. When the gear wheel 68 is rotated in the width direction, as shown in FIG. 2, the second protrusion 88B of the friction spring 88 abuts the take-up direction side edge portion of the through hole 86, and the friction spring 88 follows rotation of the gear wheel 68 in the withdrawing direction. The first protrusion 88A separates from the pawl 76, and holding of the pawl 76 by the first protrusion 88A is also released. Consequently, the pawl 76 moves toward the released position due to biasing force of the plate spring 80, and the coupled state of the gear wheel 68 and the ratchet wheel 74 (namely the coupled state of the clutch 66) is released due to the pawl 76.

As explained above, in the present exemplary embodiment, since the pawl 76 is directly moved by the friction spring 88 mounted to the spring mounting portion 90 of the clutch housing 40, the configuration for moving the pawl 76 can be simplified.

In the present exemplary embodiment, when the gear wheel 68 rotates in the take-up direction, rotational force of the rotating body is input to the first protrusion 88A provided at one end in the circumferential direction of the friction spring 88, and when the gear wheel 68 is rotated in the withdrawing direction rotational force of the gear wheel 68 is input to the second protrusion 88B provided at the other end of the friction spring 88 in the circumferential direction. Good durability of the friction spring 88 can thereby be ensured due to the use of rotational force input portions at both end portions of the friction spring 88 in the circumferential direction.

In the present exemplary embodiment, the friction spring 88 is readily produced, since the manufactured friction spring 88 can be configured by bending a metal wire spring material round into a C-shape, together with bending the two end portions in the circumferential direction thereof.

Note that in the present exemplary embodiment described above, the friction spring 88 is configured with the first protrusion 88A and the second protrusion 88B, however the present invention is not limited thereto, and configuration may also be made omitting the second protrusion 88B. In such cases, configuration is made such that when the gear wheel 68 rotates in the withdrawing direction, the first protrusion 88A abuts and is pressed by the take-up direction side hole edge portion of the through hole 84 (see the hole edge portion on the arrow A direction side in FIG. 2 and FIG. 4), and the friction spring 88 follows rotation of the gear wheel 68.

In the exemplary embodiment described above, the friction spring 88 is also configured mounted on the clutch housing 40, however the present invention is not limited thereto, and configuration may be made in which the friction spring 88 is mounted to the cover 41 of the clutch housing 40.

What is claimed is:

1. A webbing take-up device comprising:
   a take-up shaft that takes up webbing for restraining a vehicle occupant by being rotated in a take-up direction, and that is rotated in a withdrawing direction by the webbing being pulled out;
   a rotating body provided at one side of the take-up shaft in the axial line direction;
   a support member that supports the take-up shaft and the rotating body such that relative rotation therebetween is permitted in the take-up direction and in the withdrawing direction, the support member being provided with a spring mounting portion with an outer peripheral portion coaxial to the rotating body;
   a motor that rotates the rotating body in the take-up direction;
   a pawl attached to the rotating body, the pawl being moveable between a coupled position, in which relative rotation of the rotating body with respect to the take-up shaft is restricted in the take-up direction, and a released position, in which the restriction is released, with the pawl being biased toward the released position; and
   a friction spring having a substantially C-shaped bent portion disposed so as to be in direct frictional engagement with the spring mounting portion of the support member over substantially the entire length of the C-shaped bent portion, a first circumferential direction end of the friction spring moving from a disengaged position to an engaged position with respect to the pawl to move the pawl toward the coupled position and holding the pawl in the coupled position when the rotating body is rotated in the take-up direction, with the friction spring moving with the rotating body while generating friction force between the spring and the spring mounting portion and a diameter of the friction spring increasing on rotation of the friction spring in the take-up direction following the rotating body, due to the first circumferential direction end of the friction spring being pressed by the pawl,
   wherein when the motor rotates in a reverse direction which is opposite to a direction required for rotating the rotating body in the take-up direction, the friction spring rotates in the withdrawing direction due to a second circumferential direction end of the friction spring being pressed by the rotating body rotating, and the holding of the pawl by the first circumferential direction end of the friction spring is released.

2. The webbing take-up device of claim 1, further comprising: a pre-tensioner mechanism that when actuated rotates the take-up shaft in the take-up direction; and
   a ratchet wheel coupled to the take-up shaft to which the pawl moved to the coupled position meshes, wherein when the pre-tensioner mechanism is actuated and the friction spring is holding the pawl in the coupled position, the ratchet wheel permits rotation of the take-up shaft in the take-up direction by moving the pawl toward the released position as the ratchet wheel increases the diameter of the friction spring.

3. The webbing take-up device of claim 1, wherein the substantially C-shaped bent portion of the friction spring substantially circumscribes the spring mounting portion.

4. The webbing take-up device of claim 1, wherein the substantially C-shaped bent portion of the friction spring is relatively movable with respect to the rotating body in a direction around an axis of rotation of the rotating body.

* * * * *